United States Patent
Ishihara et al.

(10) Patent No.: US 11,987,115 B2
(45) Date of Patent: May 21, 2024

(54) VEHICLE HEAT EXCHANGE SYSTEM AND DUMP TRUCK

(71) Applicant: HITACHI CONSTRUCTION MACHINERY CO., LTD., Tokyo (JP)

(72) Inventors: Kazunori Ishihara, Mito (JP); Jun Ikeda, Tsuchiura (JP); Takaaki Tanaka, Ushiku (JP); Yoshifumi Nabeshima, Tsukuba (JP); Hideaki Iijima, Tsukuba (JP); Tsukasa Akiyama, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 283 days.

(21) Appl. No.: 17/634,585

(22) PCT Filed: Feb. 19, 2020

(86) PCT No.: PCT/JP2020/006512
§ 371 (c)(1),
(2) Date: Feb. 11, 2022

(87) PCT Pub. No.: WO2021/166117
PCT Pub. Date: Aug. 26, 2021

(65) Prior Publication Data
US 2022/0281311 A1  Sep. 8, 2022

(51) Int. Cl.
*B60K 11/04* (2006.01)
*B60K 11/06* (2006.01)
*F01P 3/18* (2006.01)

(52) U.S. Cl.
CPC .............. *B60K 11/04* (2013.01); *B60K 11/06* (2013.01); *F01P 2003/182* (2013.01)

(58) Field of Classification Search
CPC ..... B60K 11/04; B60K 11/06; F01P 2003/182
(Continued)

(56) References Cited

U.S. PATENT DOCUMENTS 8,960,342 B2 * 2/2015 Werner ................. B60K 11/04
165/41
9,057,317 B2 * 6/2015 Vuk .................... B60H 1/00828
(Continued)

FOREIGN PATENT DOCUMENTS

EP        1770255 A1 * 4/2007    ................ F01P 3/18
JP       04-133820 A      5/1992
(Continued)

OTHER PUBLICATIONS

English translation EP-1770255 created Dec. 29, 2023.*
International Search Report of PCT/JP2020/006512 dated Apr. 14, 2020.

*Primary Examiner* — Joel M Attey
(74) *Attorney, Agent, or Firm* — MATTINGLY & MALUR, PC

(57) ABSTRACT

Provided is a technique for improving the cooling efficiency of a vehicle heat exchange system configured to cool a cooling liquid discharged from each of a plurality of heat sources. The vehicle heat exchange system comprises a high-temperature side radiator unit and a low-temperature side radiator unit, the high-temperature side radiator including: a first high-temperature side radiator that faces a first fan and is connected to a high-temperature side discharge pipe; a second high-temperature side radiator that faces a second fan and is connected to a high-temperature side supply pipe; and a high-temperature side connection pipe for supplying the cooling liquid from the first high-temperature side radiator to the second high-temperature side radiator, and the low-temperature side radiator unit including: a first low-temperature side radiator that is arranged to face the second high-temperature side radiator on the upstream side of the cooling air flow, and is connected to a low-temperature side discharge pipe; a second low-temperature side radiator that is arranged to face the first high-temperature side radiator on
(Continued)

the upstream side of the cooling air flow, and is connected to a low-temperature side supply pipe; and a low-temperature side connection pipe for supplying the cooling liquid from the first low-temperature side radiator to the second low-temperature side radiator.

5 Claims, 5 Drawing Sheets

(58) Field of Classification Search
USPC .......................................................... 165/44
See application file for complete search history.

(56) References Cited

U.S. PATENT DOCUMENTS

| 2013/0153180 A1* | 6/2013 | Montocchio | ........... B60K 11/04 |
| | | | 165/121 |
| 2016/0001629 A1* | 1/2016 | Rohr | ...................... B60K 11/04 |
| | | | 165/76 |
| 2019/0390913 A1* | 12/2019 | Favaretto | .............. F28D 1/0443 |

FOREIGN PATENT DOCUMENTS

| JP | 2004-019487 A | 1/2004 |
| JP | 2004-299446 A | 10/2004 |
| JP | 2014-133550 A | 7/2014 |
| JP | 2018-096241 A | 6/2018 |
| JP | 2019-119356 A | 7/2019 |
| JP | 20191-19356 A | 7/2019 |

* cited by examiner

VEHICLE HEAT EXCHANGE SYSTEM AND DUMP TRUCK

TECHNICAL FIELD

The present invention relates to a vehicle heat exchange system for cooling a cooling liquid discharged from a heat source and supplying the cooled cooling liquid to the heat source again.

BACKGROUND ART

Conventionally, a vehicle equipped with a plurality of radiators respectively corresponding to a plurality of heat sources has been known. For example, Patent Literature 1 discloses a vehicle heat exchanger including a high-temperature side radiator for cooling a cooling liquid discharged from a high-temperature heat source and a low-temperature side radiator for cooling a cooling liquid discharged from a low-temperature heat source.

The vehicle heat exchanger according to Patent Literature 1 is arranged such that cooling air generated by a cooling fan hits against the low-temperature side radiator and the cooling air passing through the low-temperature side radiator hits against the high-temperature side radiator.

CITATION LIST

Patent Literature

Patent Literature 1: JP-A-2014-133550

SUMMARY OF INVENTION

Technical Problem

However, since the high-temperature side radiator and the low-temperature side radiator according to Patent Literature 1 are disposed, respectively, at positions where an inlet port and an outlet port in and from which the cooling liquid flows face to each other, a temperature difference between the cooling liquid passing through the high-temperature side radiator and that passing through the low-temperature side radiator is reduced, which results in a problem of reduction in the cooling efficiency.

The present invention has been made in view of the actual situations mentioned above, and thus an object of the present invention is to provide a technique for improving the cooling efficiency of a vehicle heat exchange system configured to cool a cooling liquid discharged from each of a plurality of heat sources.

Solution to Problem

In order to achieve the object described above, the present invention provides a vehicle heat exchange system comprising: a plurality of cooling fans for generating a flow of cooling air; a high-temperature side radiator unit configured to transfer heat between a cooling liquid discharged from a high-temperature heat source and the cooling air generated by the plurality of cooling fans, and supply the cooling liquid to the high-temperature heat source again; and a low-temperature side radiator unit configured to transfer heat between a cooling liquid discharged from a low-temperature heat source whose temperature is less than that of the high-temperature heat source and the cooling air generated by the plurality of cooling fans, and supply the cooling liquid to the low-temperature heat source again, wherein the high-temperature side radiator unit includes: a first high-temperature side radiator that faces a first fan, which is a part of the plurality of cooling fans, and is connected to a high-temperature side discharge pipe for discharging the cooling liquid from the high-temperature heat source; a second high-temperature side radiator that faces a second fan, which is different from the first fan among the plurality of cooling fans, and is connected to a high-temperature side supply pipe for supplying the cooling liquid to the high-temperature heat source; and a high-temperature side connection pipe for supplying the cooling liquid from the first high-temperature side radiator to the second high-temperature side radiator, and the low-temperature side radiator unit includes: a first low-temperature side radiator that is arranged so as to face the second high-temperature side radiator on an upstream side of the flow of the cooling air, and is connected to a low-temperature side discharge pipe for discharging the cooling liquid from the low-temperature heat source; a second low-temperature side radiator that is arranged so as to face the first high-temperature side radiator on the upstream side of the flow of the cooling air, and is connected to a low-temperature side supply pipe for supplying the cooling liquid to the low-temperature heat source; and a low-temperature side connection pipe for supplying the cooling liquid from the first low-temperature side radiator to the second low-temperature side radiator.

Advantageous Effects of Invention

According to the present invention, it is possible to improve the cooling efficiency of a vehicle heat exchange system configured to cool a cooling liquid discharged from each of a plurality of heat sources. The problems, configurations, and advantageous effects other than those described above will be clarified by explanation of the embodiment below.

DESCRIPTION OF EMBODIMENTS

Figure 1:
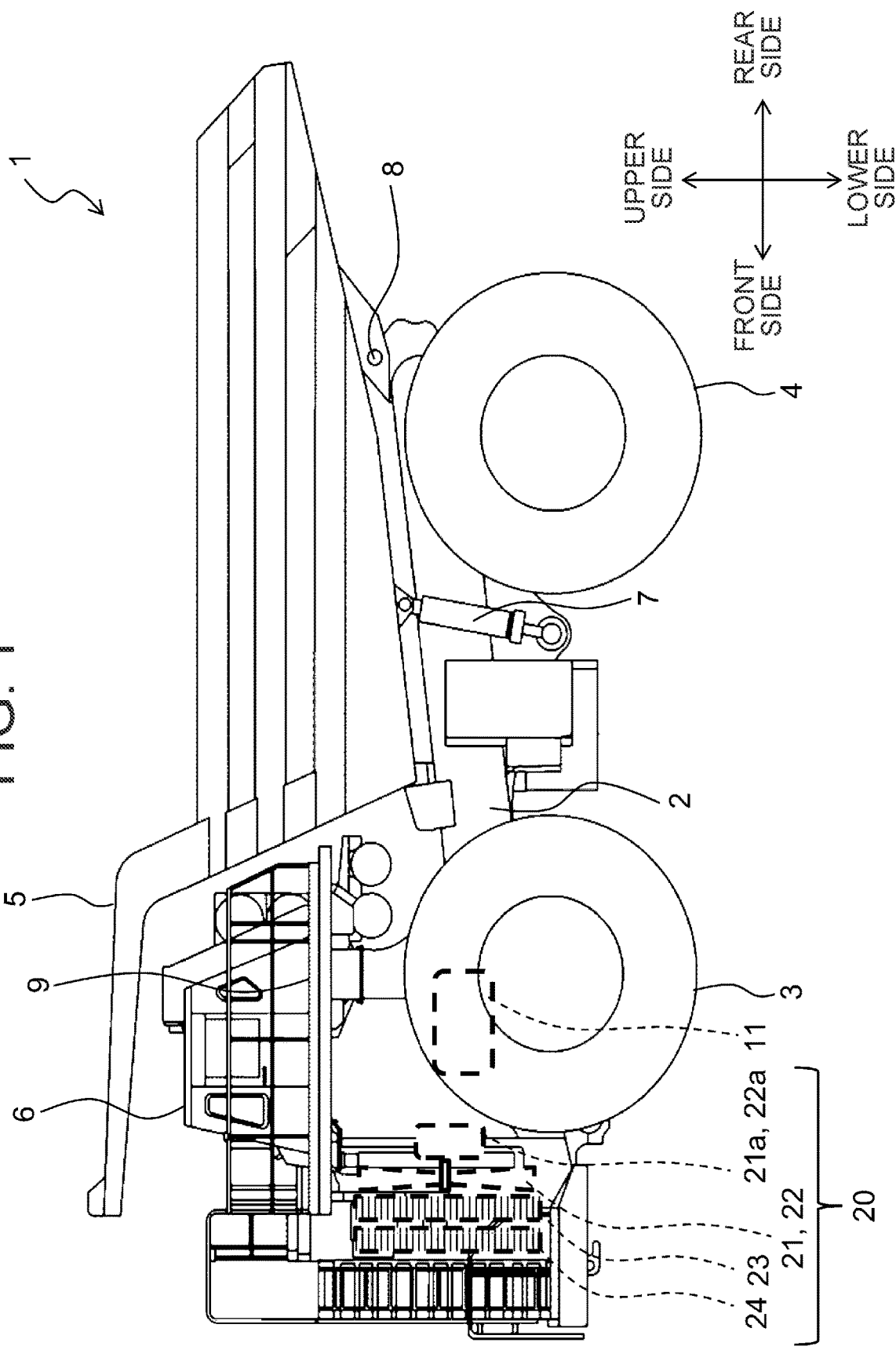
FIG. 1 is a side view of a dump truck according to the present embodiment.
Figure 2:
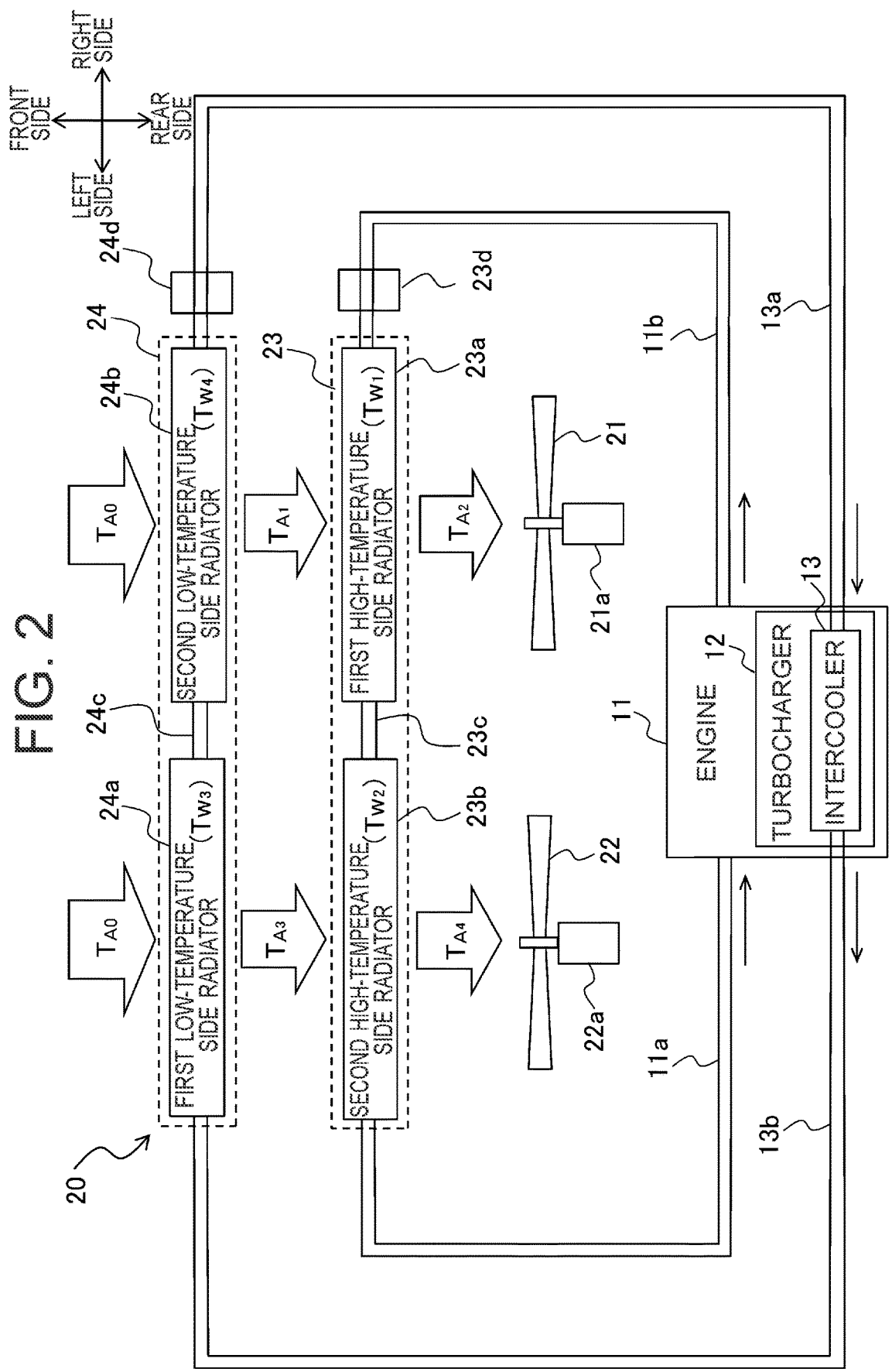
FIG. 2 is a schematic configuration diagram of a vehicle heat exchange system.
Figure 3:
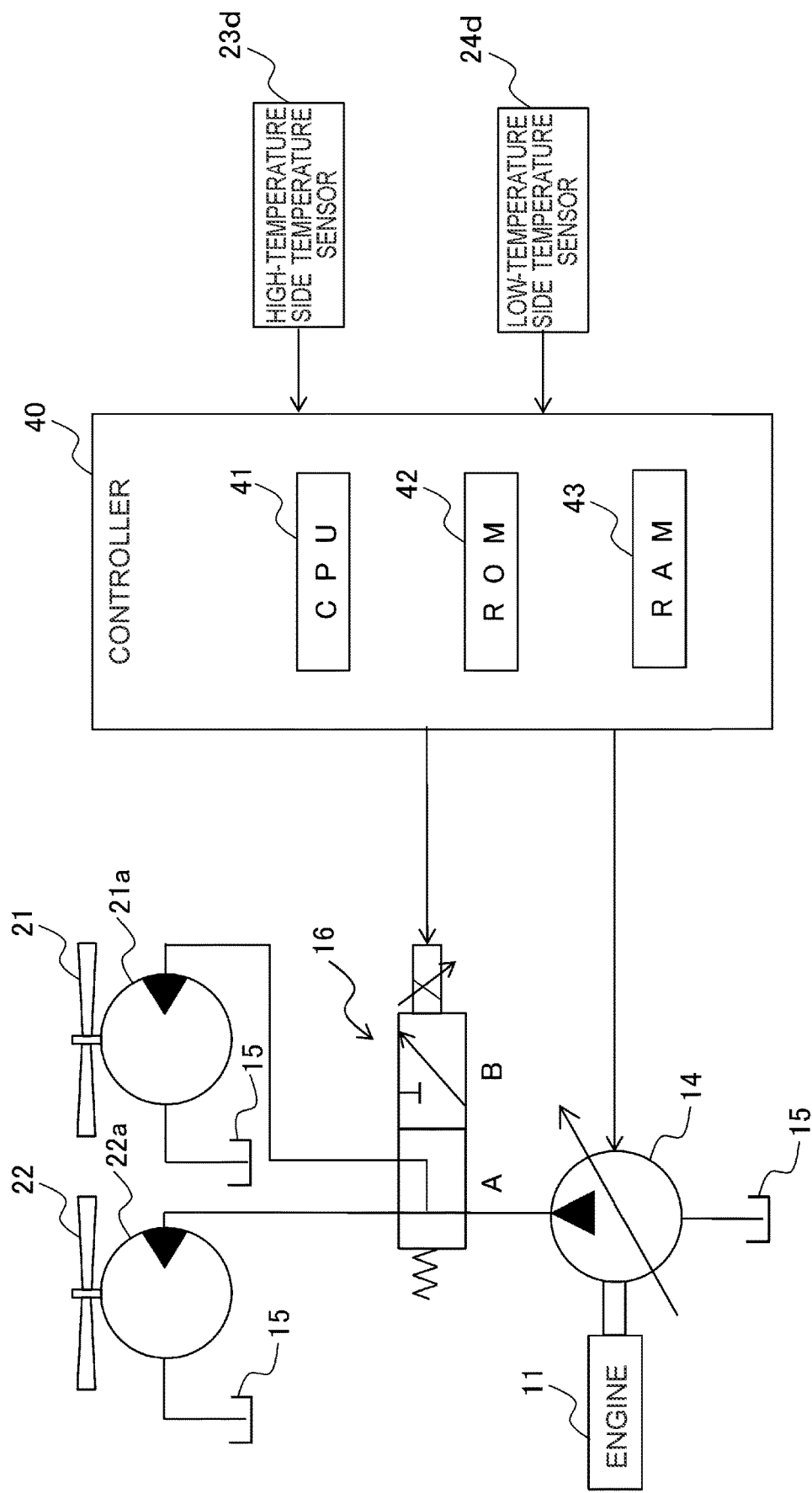
FIG. 3 is a hardware configuration diagram of a dump truck.

An embodiment of a dump truck 1 which is an example of a vehicle according to the present invention will be described with reference to the drawings. FIG. 1 is a side view of the dump truck 1 according to the present embodiment. FIG. 2 is a schematic configuration diagram of a vehicle heat exchange system 20. FIG. 3 is a hardware configuration diagram of the dump truck 1. Note that, unless otherwise stated, the viewpoint of an operator who gets in and operates the dump truck 1 serves as a reference of the front, rear, left, and right mentioned in the present specification.

As illustrated in FIG. 1, the dump truck 1 according to the present embodiment mainly includes a vehicle body frame 2, a pair of front wheels 3 rotatably supported at the left and right ends of the front portion of the vehicle frame 2, respectively, a pair of rear wheels 4 rotatably supported at the left and right ends of the rear portion of the vehicle frame 2, respectively, a vessel 5 supported on the vehicle frame 2 so as to be raised up and laid down, and a cab 6 provided for an operator who operates the dump truck 1 to get in. The cab 6 is arranged on the left end of a deck 9 provided at the front end of the vehicle frame 2.

Each of the pair of front wheels 3 is a steering wheel whose steering angle can be changed by a steering operation by the operator. On the other hand, each of the pair of rear wheels 4 is a driving wheel which is rotated in accordance with transmission of a driving force of a traction motor (not illustrated). Note that the dump truck 1 includes a pair of traction motors to transmit the driving force to each of the pair of rear wheels 4, independently.

The vessel 5 is hinged by a hinge pin 8 on the rear portion of the vehicle frame 2 so as to be raised up and laid down in the upper and lower direction by extension and contraction of a hoist cylinder 7. The hoist cylinder 7 is designed such that its one end is connected to the vehicle body frame 2 and the other end is connected to the vessel 5, and is made extended and contracted by hydraulic oil supplied from a hydraulic pump (not illustrated). The extension of the hoist cylinder 7 causes the vessel 5 to rise, and the contraction of the hoist cylinder 7 causes the vessel 5 to lie down.

Furthermore, the dump truck 1 includes an engine (high-temperature heat source) 11 configured to generate a driving force for activating the dump truck 1, a turbocharger (low-temperature heat source) 12 configured to compress the air and supply the compressed air to the engine 11, a vehicle heat exchange system 20 configured to transfer heat between a cooling liquid (such as water or oil) for cooling the engine 11 and the turbocharger 12 and the cooling air, and a controller 40 configured to control the operations of the dump truck 1.

The engine 11 generates a driving force for activating the dump truck 1 by burning fuel. Specifically, the driving force of the engine 11 is transmitted to a hydraulic pump 14, whereby the hydraulic oil stored in a hydraulic oil tank 15 is pumped to the hoist cylinder 7. Furthermore, the driving force of the engine 11 is transmitted to a generator (not illustrated), whereby power for rotating the traction motor is generated.

The engine 11 generates heat when being driven. Accordingly, a cooling liquid passage through which the cooling liquid flows is formed inside the engine 11. The cooling liquid is supplied to the engine 11 through a high-temperature side supply pipe 11*a*, absorbs the heat of the engine 11 during passing through the cooling liquid passage, and is discharged from the engine 11 through a high-temperature side discharge pipe 11*b*.

The turbocharger 12 compresses the air by using the exhaust air from the engine 11, and supplies the compressed air to the engine 11. The turbocharger 12 includes an intercooler 13 that cools the compressed air by transferring heat between the compressed air and the cooling liquid (such as water or oil). The cooling liquid is supplied to the intercooler 13 through a low-temperature side supply pipe 13*a*, used to transfer the heat between the compressed air and the cooling liquid, and discharged from the intercooler 13 through a low-temperature side discharge pipe 13*b*.

The temperature of the heat generated by the engine 11 is higher than the temperature of the heat generated by the turbocharger 12. In other words, the temperature of the cooling liquid passing through the high-temperature side discharge pipe 11*b* is higher than the temperature of the cooling liquid passing through the low-temperature side discharge pipe 13*b*. That is, the engine 11 is a heat source whose temperature is higher than that of the turbocharger 12. In other words, the turbocharger 12 is a heat source whose temperature is lower than that of the engine 11.

As illustrated in FIG. 1, the vehicle heat exchange system 20 is disposed at a lower portion of the front end of the vehicle frame 2. As illustrated in FIG. 1 and FIG. 2, the vehicle heat exchange system 20 mainly includes a plurality of cooling fans 21, 22, a high-temperature side radiator unit 23, and a low-temperature side radiator unit 24. An amount of heat dissipation required by the low-temperature side radiator unit 24 is less than that of the high-temperature side radiator unit 23.

Fan motors 21*a*, 22*a* are rotated in accordance with the transmission of the driving force of the engine 11, whereby the plurality of cooling fans 21, 22 generates the cooling air. The cooling fans 21, 22 are disposed adjacent to each other in the left and right direction of the dump truck 1. The cooling air generated by the cooling fans 21, 22 flows from the front side of the dump truck 1 toward the rear side thereof. That is, the vehicle heat exchange system 20 is disposed on the vehicle frame 2 such that the flow of the cooling air matches the traveling direction of the dump truck 1 (front and rear direction).

The high-temperature side radiator unit 23 is configured to transfer the heat between the cooling liquid discharged from the engine 11 and the cooling air, and supply the cooling liquid whose temperature has decreased to the engine 11 again. The high-temperature side radiator unit 23 is disposed on the path of the cooling air generated by the cooling fans 21, 22. The high-temperature side radiator unit 23 faces the cooling fans 21, 22 on the upstream side of the flow of the cooling air. The high-temperature side radiator unit 23 mainly includes a first high-temperature side radiator 23*a*, a second high-temperature side radiator 23*b*, a high-temperature side connection pipe 23*c*, and a high-temperature side temperature sensor 23*d*.

The first high-temperature side radiator 23*a* is disposed to face the cooling fan 21. The second high-temperature side radiator 23*b* is disposed to face the cooling fan 22. That is, the first high-temperature side radiator 23*a* and the second high-temperature side radiator 23*b* are disposed adjacent to each other in the left and right direction of the dump truck 1. The high-temperature side connection pipe 23*c* connects the first high-temperature side radiator 23*a* and the second high-temperature side radiator 23*b*.

Furthermore, the first high-temperature side radiator 23*a* is connected to the high-temperature side discharge pipe 11*b*. More specifically, the high-temperature side discharge pipe 11*b* is connected to the first high-temperature side radiator 23*a* on the side opposite to the connection position of the high-temperature side connection pipe 23*c* in the left and right direction of the dump truck 1 (in the present embodiment, on the right side). The second high-temperature side radiator 23*b* is connected to the high-temperature side supply pipe 11*a*. More specifically, the high-temperature side supply pipe 11*a* is connected to the second high-temperature side radiator 23*b* on the side opposite to the connection position of the high-temperature side connection pipe 23*c* in the left and right direction of the dump truck 1 (in the present embodiment, on the left side).

That is, in the high-temperature side radiator unit 23, the cooling liquid is supplied from the engine 11 to the first high-temperature side radiator 23*a* through the high-temperature side discharge pipe 11*b*, the cooling liquid is supplied from the first high-temperature side radiator 23*a* to the second high-temperature side radiator 23b through the high-temperature side connection pipe 23c, and the cooling liquid is supplied from the second high-temperature side radiator 23b to the engine 11 through the high-temperature side supply pipe 11a.

That is, in the present embodiment, the cooling liquid circulates counterclockwise in FIG. 2 between the engine 11 and the high-temperature side radiator unit 23. In other words, in the present embodiment, the cooling liquid flows in the high-temperature side radiator unit 23 from the right to left (one direction in the left and right direction) of the dump truck 1.

While the cooling liquid is passing through the first high-temperature side radiator 23a, the heat thereof is transferred to the cooling air generated by the cooling fan 21, and while the cooling liquid is passing through the second high-temperature side radiator 23b, the heat thereof is transferred to the cooling air generated by the cooling fan 22. Thus, the cooling liquid is cooled. That is, the temperature $T_{W1}$ of the cooling liquid in the first high-temperature side radiator 23a is higher than the temperature $T_{W2}$ of the cooling liquid in the second high-temperature side radiator 23b.

The high-temperature side temperature sensor 23d is configured to detect the temperature of the cooling liquid supplied to the high-temperature side radiator unit 23. The high-temperature side temperature sensor 23d is provided to monitor overheating of the engine 11. The high-temperature side temperature sensor 23d can be disposed anywhere from the outlet of the engine 11 to the inlet of the first high-temperature side radiator 23a, and in the present embodiment, it is disposed at the inlet of the first high-temperature side radiator 23a to detect the temperature of the cooling liquid that has passed through the high-temperature side discharge pipe 11b. Then, the high-temperature side temperature sensor 23d outputs a detection signal indicating the detected temperature of the cooling liquid (hereinafter, referred to as a "cooling liquid temperature T") to the controller 40.

The low-temperature side radiator unit 24 is configured to transfer the heat between the cooling liquid discharged from the intercooler 13 and the cooling air, and supply the cooling liquid whose temperature has decreased to the intercooler 13 again. The low-temperature side radiator unit 24 is disposed on the path of the cooling air generated by the cooling fans 21, 22. The low-temperature side radiator unit 24 faces the high-temperature side radiator unit 23 on the upstream side of the flow of the cooling air. The low-temperature side radiator unit 24 mainly includes a first low-temperature side radiator 24a, a second low-temperature side radiator 24b, a low-temperature side connection pipe 24c, and a low-temperature side temperature sensor 24d.

The first low-temperature side radiator 24a is arranged so as to face the second high-temperature side radiator 23b. The second low-temperature side radiator 24b is arranged so as to face the first high-temperature side radiator 23a. That is, the first low-temperature side radiator 24a and the second low-temperature side radiator 24b are disposed adjacent to each other in the left and right direction of the dump truck 1. The low-temperature side connection pipe 24c connects the first low-temperature side radiator 24a and the second low-temperature side radiator 24b.

Furthermore, the first low-temperature side radiator 24a is connected to the low-temperature side discharge pipe 13b. More specifically, the low-temperature side discharge pipe 13b is connected to the first low-temperature side radiator 24a on the side opposite to the connection position of the low-temperature side connection pipe 24c in the left and right direction of the dump truck 1 (in the embodiment, on the left side). Furthermore, the second low-temperature side radiator 24b is connected to the low-temperature side supply pipe 13a. More specifically, the low-temperature side supply pipe 13a is connected to the second low-temperature side radiator 24b on the side opposite to the connection position of the low-temperature side connection pipe 24c in the left and right direction of the dump truck 1 (in the present embodiment, on the right side).

That is, in the low-temperature side radiator unit 24, the cooling liquid is supplied from the intercooler 13 to the first low-temperature side radiator 24a through the low-temperature side discharge pipe 13b, the cooling liquid is supplied from the first low-temperature side radiator 24a to the second low-temperature side radiator 24b through the low-temperature side connection pipe 24c, and the cooling liquid is supplied from the second low-temperature side radiator 24b to the intercooler 13 through the low-temperature side supply pipe 13a.

That is, in the present embodiment, the cooling liquid circulates clockwise in FIG. 2 between the intercooler 13 and the low-temperature side radiator unit 24. In other words, in the present embodiment, the cooling liquid flows in the low-temperature side radiator unit 24 from the left to right (the other direction in the left and right direction) of the dump truck 1.

While the cooling liquid is passing through the first low-temperature side radiator 24a, the heat thereof is transferred to the cooling air generated by the cooling fan 22, and while the cooling liquid is passing through the second low-temperature side radiator 24b, the heat thereof is transferred to the cooling air generated by the cooling fan 21. Thus, the cooling liquid is cooled. That is, the temperature $T_{W3}$ of the cooling liquid in the first low-temperature side radiator 24a is higher than the temperature $T_{W4}$ of the cooling liquid in the second low-temperature side radiator 24b. In this connection, the relation between each temperature is $T_{W1} > T_{W2} > T_{W3} > T_{W4}$.

The low-temperature side temperature sensor 24d is configured to detect the temperature of the cooling liquid that has passed through the low-temperature side radiator unit 24. The low-temperature side temperature sensor 24d is provided to monitor the temperature of the cooling liquid supplied to the intercooler 13. The low-temperature side temperature sensor 24d can be disposed anywhere from the outlet of the second low-temperature side radiator 24b to the intercooler 13, in the present embodiment, it is disposed at the outlet of the second low-temperature side radiator 24b to monitor the temperature of the cooling liquid passing through the low-temperature side supply pipe 13a. Then, the low-temperature side temperature sensor 24d outputs a detection signal indicating the temperature of the detected cooling liquid to the controller 40.

The cooling air at the temperature $T_{A0}$ generated by the cooling fan 21 firstly hits against the front surface of the second low-temperature side radiator 24b, and the heat is transferred between the cooling liquid in the second low-temperature side radiator 24b and the cooling air, whereby the temperature of the cooling air increases to the temperature $T_{A1}$. Next, the cooling air that has passed through a clearance of the second low-temperature side radiator 24b hits against the front surface of the first high-temperature side radiator 23a, and the heat is transferred between the cooling liquid in the first high-temperature side radiator 23a and the cooling air, whereby the temperature of the cooling air increases to the temperature $T_{A2}$. That is, the relation between each temperature is $T_{A0}<T_{A1}<T_{A2}$.

Furthermore, the cooling air at the temperature $T_{A0}$ generated by the cooling fan 22 firstly hits against the front surface of the first low-temperature side radiator 24a, and the heat is transferred between the cooling liquid in the first low-temperature side radiator 24a and the cooling air, thereby the temperature of the cooling air increases to the temperature $T_{A3}$. Next, the cooling air that has passed through a clearance of the first low-temperature side radiator 24a hits against the front surface of the second high-temperature side radiator 23b, and the heat is transferred between the cooling liquid in the second high-temperature side radiator 23b and the cooling air, whereby the temperature of the cooling air increases to the temperature $T_{A4}$. That is, the relation between each temperature is $T_{A0}<T_{A3}<T_{A4}$.

Here, a heat dissipation amount Q [kW] of the radiator is calculated by the following Equation 1. A heat dissipation coefficient K [kW/m2·° C.] is a constant determined by the specifications of the vehicle heat exchange system 20 (for example, performance of the cooling fans 21, 22, a heat exchange ratio of each radiator 23a, 23b, 24a, 24b, etc.). A heat dissipation area A [m2] is the total surface area which is exposed to the cooling air of each radiator 23a, 23b, 24a, 24b. A cooling liquid temperature $T_W$ is a temperature of the cooling liquid in each radiator 23a, 23b, 24a, 24b. An air temperature $T_A$ is a temperature of the cooling air passing through each radiator 23a, 23b, 24a, 24b.

$$Q=KA(T_W-T_A) \quad \text{(Equation 1)}$$

Here, the cooling liquid temperature $T_{W4}$ in the second low-temperature side radiator 24b is lower than the cooling liquid temperature $T_{W3}$ in the first low-temperature side radiator 24a. Accordingly, in the case where the air volume of the cooling fan 21 is the same as that of the cooling fan 22, the cooling air temperature $T_{A1}$ that has passed through the second low-temperature side radiator 24b is less than the cooling air temperature $T_{A3}$ that has passed through the first low-temperature side radiator 24a.

Furthermore, the cooling liquid temperature $T_{W1}$ in the first high-temperature side radiator 23a is higher than the cooling liquid temperature $T_{W2}$ in the second high-temperature side radiator 23b. Accordingly, an air-water temperature difference $(T_{W1}-T_{A1})$ of the first high-temperature side radiator 23a is more than an air-water temperature difference $(T_{W2}-T_{A3})$ of the second high-temperature side radiator 23b. As a result, in the case where the heat radiation area A of the first high-temperature side radiator 23a is the same as that of the second high-temperature side radiator 23b, the heat radiation amount Q of the first high-temperature side radiator 23a is more than that of the second high-temperature side radiator 23b.

Each of the fan motors 21a, 22a is a hydraulic motor which is rotated in accordance with supply of the hydraulic oil pumped from the hydraulic pump 14 through a solenoid proportional valve (flow rate control valve) 16. The hydraulic oil which has rotated the fan motors 21a, 22a is refluxed to the hydraulic oil tank 15. The fan motor 21a is an example of a first hydraulic motor for driving the cooling fan 21, and the fan motor 22a is an example of a second hydraulic motor for driving the cooling fan 22. However, the fan motors 21a, 22a are not limited to hydraulic motors, and may be electric motors which are rotated in accordance with supply of power.

Upon receiving the driving force of the engine 11, the hydraulic pump 14 pumps the hydraulic oil stored in the hydraulic oil tank 15 to the solenoid proportional valve 16.

The hydraulic pump 14 is a variable displacement hydraulic pump in which the tilting (capacity) can be changed in accordance with the control by the controller 40. The hydraulic pump 14 is, for example, a swash plate type or a swash shaft type pump which allows the controller 40 to control the displacement volume in accordance with a tilt angle. Changing the tilting increases or decreases the amount of hydraulic oil pumped from the hydraulic pump 14.

The solenoid proportional valve 16 changes a distribution ratio of the hydraulic oil to be supplied from the hydraulic pump 14 to the fan motors 21a, 22a in accordance with the control of the controller 40. The solenoid proportional valve 16 has a position A and a position B. An initial position of the solenoid proportional valve 16 is the position A. When a control voltage is applied from the controller 40 to a pilot port, the solenoid proportional valve 16 is moved from the position A toward the position B. That is, the higher the control voltage is, the closer to the position B the solenoid proportional valve 16 is moved while the lower the control voltage is, the closer to the position A the solenoid proportional valve 16 is positioned.

The position A is a position for supplying the hydraulic oil supplied from the hydraulic pump 14 to the fan motors 21a, 22a evenly (that is, ½ for each). The position B is a position for supplying the hydraulic oil from the hydraulic pump 14 only to the fan motor 21a without supplying the hydraulic oil to the fan motor 22a.

In a range between the position A and the position B, the distribution ratio of the hydraulic oil to be supplied from the hydraulic pump 14 to the fan motors 21a, 22a can be changed. More specifically, the closer to the position A the solenoid proportional valve 16 is positioned, the more a difference between the amount of the hydraulic oil to be supplied to the fan motor 21a and that to the fan motor 22a is reduced. On the other hand, the closer to the position B the solenoid proportional valve 16 is positioned, the more the difference between the amount of the hydraulic oil to be supplied to the fan motor 21a and that to the fan motor 22a increases. It is noted that, in the present embodiment, the amount of the hydraulic oil to be supplied to the fan motor 21a is equal to or more than the amount of the hydraulic oil to be supplied to the fan motor 22a.

The controller 40 includes a CPU (Central Processing Unit) 41, a ROM (Read Only Memory) 42, and a RAM (Random Access Memory) 43. The CPU 41 reads out and executes a program code stored in the ROM 42, whereby the controller 40 implements the processing which will be described later. The RAM 43 is used as a work area during execution of a program by the CPU 41.

However, the specific configuration of the controller 40 is not limited thereto. The controller 40 may be implemented by hardware such as an ASIC (Application Specific Integrated Circuit), an FPGA (Field-Programmable Gate Array), or the like.

Figure 4:
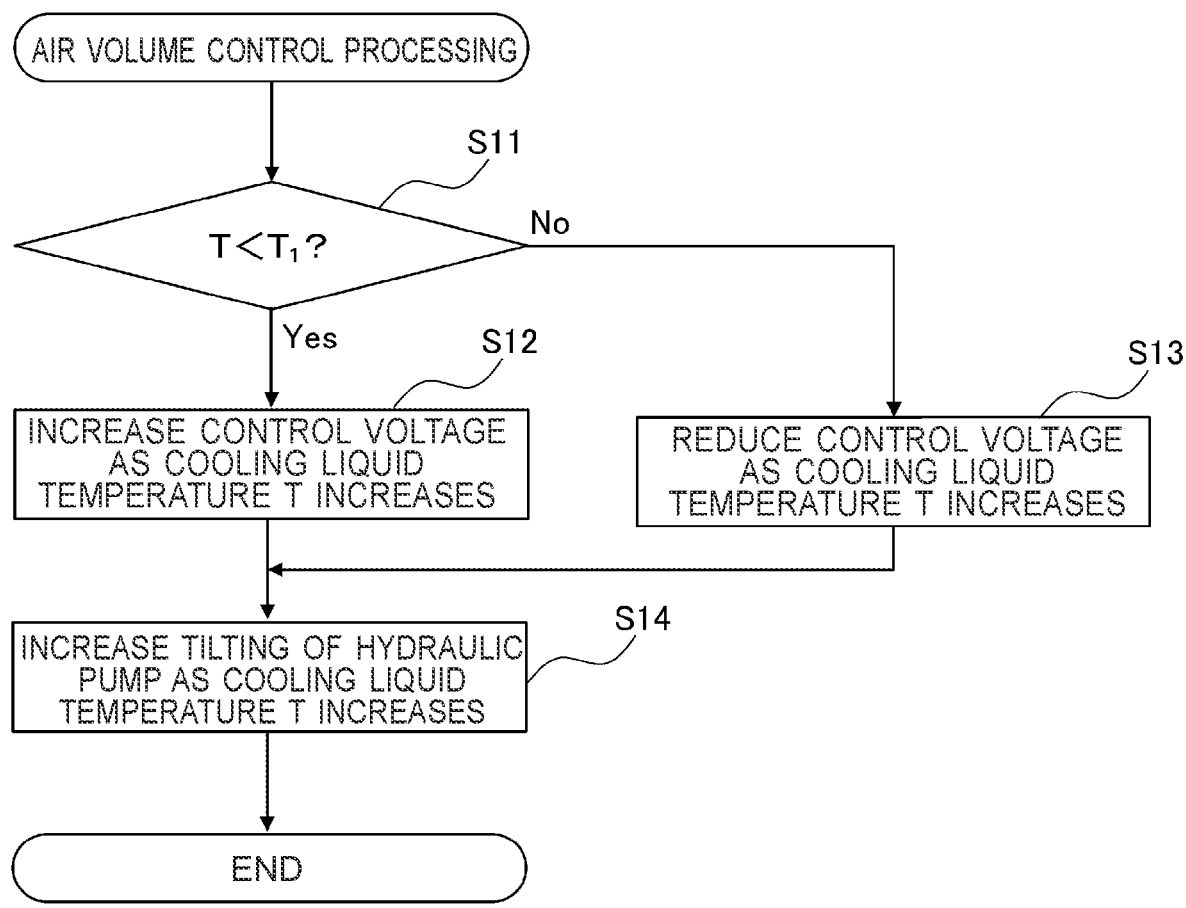
FIG. 4 is a flowchart of the air volume control processing.
Figure 5:
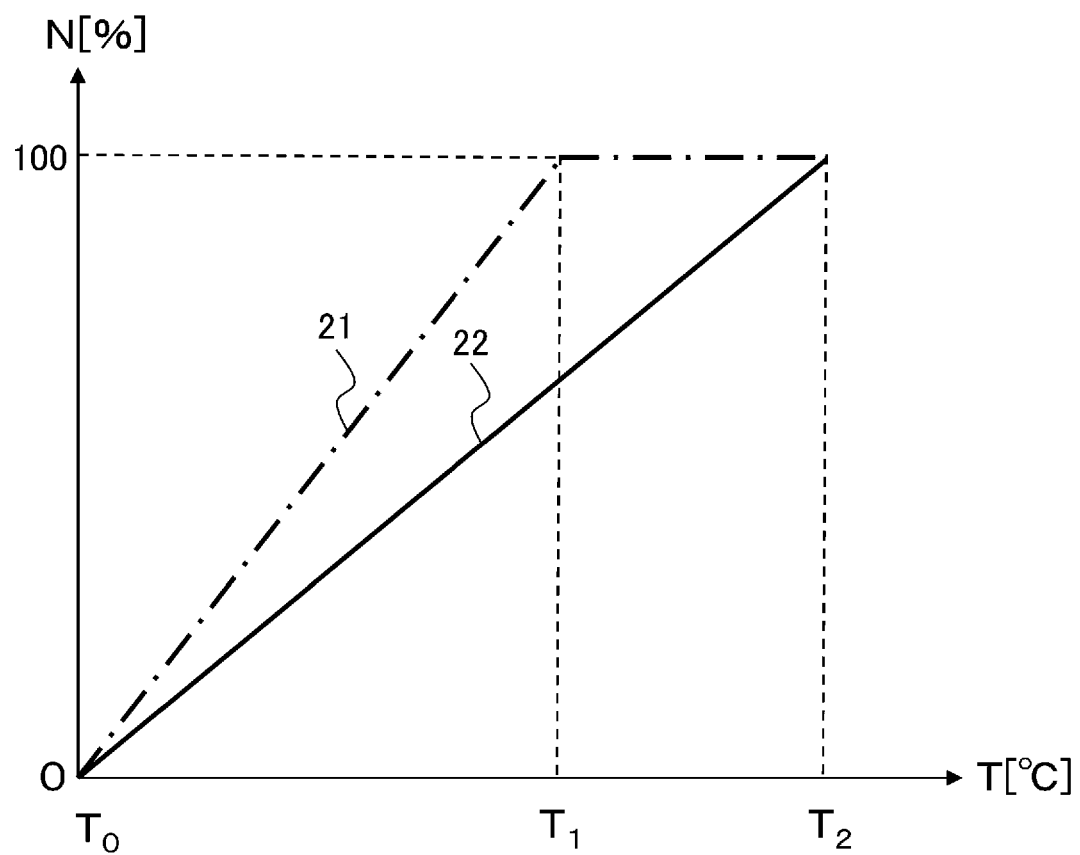
FIG. 5 illustrates a relation between a cooling liquid temperature and a distribution ratio of an air volume.

The controller 40 is configured to control the hydraulic pump 14 and the solenoid proportional valve 16 based on a temperature signal output from the high-temperature side temperature sensor 23d. FIG. 4 is a flowchart of the air volume control processing. FIG. 5 illustrates a relation between a cooling liquid temperature T detected by the high-temperature side temperature sensor 23d and a distribution ratio of the air volume of the cooling fans 21, 22. The relation illustrated in FIG. 5 is previously stored in the ROM 42 or the RAM 43.

The controller 40 starts driving the cooling fans 21, 22, for example, at the time when the cooling liquid temperature T detected by the high-temperature side temperature sensor 23d exceeds a reference temperature $T_0$ (for example, 78° C.). Then, the controller 40 repeatedly executes the air volume control processing illustrated in FIG. 4 at a predetermined time interval after starting the driving of the cooling fans 21, 22.

Firstly, the controller 40 determines whether the cooling liquid temperature T detected by the high-temperature side temperature sensor 23d is less than a predetermined first temperature $T_1$ (for example, 80° C.) (step S11). In the case of determining that the cooling liquid temperature T is less than the first temperature $T_1$ (step S11: Yes), the controller 40 controls the control voltage to be applied to the solenoid proportional valve 16 such that the higher the cooling liquid temperature T is, the higher the control voltage becomes (step S12). On the other hand, in the case of determining that the cooling liquid temperature T is equal to or higher than the first temperature $T_1$ (step S11: No), the controller 40 controls the control voltage to be applied to the solenoid proportional valve 16 such that the higher the cooling liquid temperature T is, the lower the control voltage becomes (step S13).

That is, as illustrated in the range of $T_0$ to $T_1$ of FIG. 5, the controller 40 controls the solenoid proportional valve 16 so as to, in a temperature range where the cooling liquid temperature T is equal to or higher than the reference temperature $T_0$ and less than the first temperature $T_1$, increase the flow rate of the hydraulic oil to the fan motor 21a more than the flow rate thereof to the fan motor 22a, and also increase the difference therebetween as the cooling liquid temperature T increases.

Thus, in the temperature range where the cooling liquid temperature T is equal to or higher than the reference temperature $T_0$ and less than the first temperature $T_1$, the air volume of the cooling fan 21 is more than that of the cooling fan 22, and also the difference in the air volume therebetween is increased as the cooling liquid temperature T increases. In other words, in the range of $T_0$ to $T_1$ of FIG. 5, an increase rate of the air volume in accordance with the temperature increase (that is, the inclination of the straight line in FIG. 5) of the cooling fan 21 is more than that of the cooling fan 22. In the present embodiment, the difference between the air volume of the cooling fan 21 and that of the cooling fan 22 takes the maximum at the first temperature $T_1$.

On the other hand, as illustrated in the range of $T_1$ to $T_2$ of FIG. 5, the controller 40 controls the solenoid proportional valve 16 so as to, in a temperature range where the cooling liquid temperature T is equal to or higher than the first temperature T1 and less than the second temperature $T_2$, increase the flow rate of the hydraulic oil to the fan motor 21a more than the flow rate to the fan motor 22a, and also reduces the difference therebetween as the cooling liquid temperature T decreases.

Thus, in the temperature range where the cooling liquid temperature T is equal to or higher than the first temperature $T_1$ and less than the second temperature $T_2$, the air volume of the cooling fan 21 is more than that of the cooling fan 22, and also the difference in the air volume therebetween is reduced as the cooling liquid temperature T increases. In other words, in the range of $T_1$ to $T_2$ of FIG. 5, an increase rate of the air volume in accordance with the temperature increase (that is, the inclination of the straight line in FIG. 5) of the cooling fan 22 is more than that of the cooling fan 21. In the present embodiment, the difference between the air volume of the cooling fan 21 and that of the cooling fan 22 is 0 at the second temperature $T_2$ (for example, 92° C.)

Furthermore, in the range of $T_0$ to $T_2$ of FIG. 5, the controller 40 controls the hydraulic pump 14 to be tilted more as the cooling liquid temperature T increases (step S14). More specifically, the controller 40 increases the capacity of the hydraulic pump 14 as the cooling liquid temperature T becomes high so as to increase the total flow rate to the fan motors 21a, 22a.

That is, the controller 40 adjusts the total flow rate of the hydraulic oil to be supplied to the fan motors 21a, 22a so as to realize the total air volume of the cooling fans 21, 22 corresponding to the current cooling liquid temperature T. Thus, the higher the cooling liquid temperature T is, the more the total air volume of the cooling fans 21, 22 is increased. Note that the controller 40 executes the process of step S14 in both cases of executing the process of step S12 and the process of step S13.

According to the embodiment above, for example, it is possible to obtain the following operational effects.

According to the embodiment described above, the flow direction of the cooling liquid in the high-temperature side radiator unit 23 and that in the low-temperature side radiator unit 24 are opposite to each other. In other words, the inlet port and the outlet port of the high-temperature side radiator unit 23 in and from which the cooling liquid flows are arranged, in the left and right direction, on opposite side to those of the low-temperature side radiator unit 24, respectively. With this arrangement, the difference between the cooling liquid temperature in the first high-temperature side radiator 23a and that in the second low-temperature side radiator 24b increases, thereby improving the cooling efficiency of the vehicle heat exchange system 20.

As a result, the vehicle heat exchange system 20 according to the embodiment described above requires, as compared with a conventional heat exchange system, less energy to obtain the same cooling performance (that is, fuel consumption of the engine 11 can be improved), and thus can obtain the higher cooling performance at the same energy.

In the embodiment described above, an example in which the engine 11 is a high-temperature heat source and the turbocharger 12 is a low-temperature heat source has been described, however, a combination of the high-temperature heat source and the low-temperature heat source is not limited thereto. In another example, the engine 11 may be a high temperature heat source while an oil cooler for cooling the hydraulic oil in the hydraulic oil tank 15 may be a low-temperature heat source.

Furthermore, in the embodiment described above, an example of the vehicle heat exchange system 20 including the two cooling fans 21, 22 has been described, however, the number of cooling fans is not limited to this example. In another example, four cooling fans may be combined in the upper, lower, left, and right directions, respectively. In such a case, among the plurality of cooling fans, the cooling fan facing the first high-temperature side radiator 23a and the second low-temperature side radiator 24b is set as the first fan (in the present embodiment, the cooling fan 21), and the cooling fan facing the second high-temperature side radiator 23b and the first low-temperature side radiator 24a is set as the second fan (in the present embodiment, the cooling fan 22).

According to the embodiment described above, the air volume of the cooling fan 21 facing the first high-temperature side radiator 23a and the second low-temperature side radiator 24b both having the high cooling efficiency is increased more than that of the cooling fan 22. As a result, the cooling efficiency of the vehicle heat exchange system 20 is further improved.

Furthermore, according to the embodiment described above, by adjusting the difference between the air volume of the cooling fan 21 and that of the cooling fan 22 in accordance with the cooling liquid temperature T, it is possible to change the priority among the improvement of the cooling performance of the cooling liquid and the improvement effect of fuel consumption of the engine 11, depending on a state of the dump truck 1. In this connection, note that the relation between the cooling liquid temperature T and the distribution ratio of the air volume of the cooling fans 21, 22 is not limited to the example of FIG. 5. The relation between the cooling liquid temperature T and the distribution ratio of the air volume can be appropriately set based on the type of a vehicle to be equipped with the vehicle heat exchange system 20, a purpose of use, or the like.

In the embodiment described above, an example of changing the distribution ratio of the air volume of the cooling fans 21, 22 based on the cooling liquid temperature T detected by the high-temperature side temperature sensor 23d has been described. However, the specific example of the cooling liquid temperature T is not limited to the example described above. In another example, the controller 40 may execute the air volume control processing based on the cooling liquid temperature T detected by the low-temperature side temperature sensor 24d.

Furthermore, in the embodiment described above, an example in which the difference in the air volume of the cooling fans 21, 22 is made variable in accordance with the cooling liquid temperature T has been described, however, the difference in the air volume of the cooling fans 21, 22 may be set to be fixed (cooling fan 21>cooling fan 22) without using the solenoid proportional valve 16. In addition, as another example of increasing the air volume of the cooling fan 21 more than that of the cooling fan 22, a rated air volume of the cooling fan 21 may be set to be more than that of the cooling fan 22.

Still further, according to the embodiment described above, by increasing the total air volume of the cooling fans 21, 22 in accordance with the cooling liquid temperature T, it is possible to prevent increase of the cooling liquid temperature. Note that the specific method of increasing or decreasing the total air volume of the cooling fans 21, 22 is not limited to the method of changing the tilting of the hydraulic pump 14. For example, in the case where the fan motors 21a, 22a are electric motors, a method of increasing or decreasing a current to be supplied to each motor may be employed.

Still further, according to the embodiment described above, the vehicle heat exchange system 20 has been applied to a large sized dump truck which travels in the mine. As a result, even in the case of a vehicle used in a harsh environment, it is possible to maintain the cooling liquid within an appropriate temperature range. However, a vehicle to be equipped with the vehicle heat exchange system 20 is not limited to the dump truck 1, and it may be a hydraulic excavator, a crane vehicle, a wheel loader, or the like.

The embodiment described above is an illustrative one for explaining the present invention, and is not provided to limit the scope of the present invention only thereto. Those skilled in the art will be able to carry out the invention in various other aspects without departing from the gist of the invention.

REFERENCE SIGNS LIST 1 dump truck
2 vehicle body frame
3 front wheel
4 rear wheel
5 vessel
6 cab
7 hoist cylinder
8 hinge pin
9 deck
11 engine (high-temperature heat source)
11a high-temperature side supply pipe
11b high-temperature side discharge pipe
12 turbocharger (low-temperature heat source)
13 intercooler
13a low-temperature side supply pipe
13b low-temperature side discharge pipe
14 hydraulic pump
15 hydraulic oil tank
16 solenoid proportional valve (flow rate control valve)
20 vehicle heat exchange system
21, 22 cooling fan
21a, 22a fan motor
23 high-temperature side radiator unit
23a first high-temperature side radiator
23b second high-temperature side radiator
23c high-temperature side connection pipe
23d high-temperature side temperature sensor
24 low-temperature side radiator unit
24a first low-temperature side radiator
24b second low-temperature side radiator
24c low-temperature side connection pipe
24d low-temperature side temperature sensor
40 controller
41 CPU
42 ROM
43 RAM

The invention claimed is:

1. A vehicle heat exchange system comprising:
a plurality of cooling fans for generating a flow of cooling air;
a high-temperature side radiator unit configured to transfer heat between a cooling liquid discharged from a high-temperature heat source and the cooling air generated by the plurality of cooling fans, and supply the cooling liquid to the high-temperature heat source again; and
a low-temperature side radiator unit configured to transfer heat between the cooling liquid discharged from a low-temperature heat source whose temperature is less than that of the high-temperature heat source and the cooling air generated by the plurality of cooling fans, and supply the cooling liquid to the low-temperature heat source again,
wherein
the high-temperature side radiator unit includes:
　a first high-temperature side radiator that faces a first fan, which is a part of the plurality of cooling fans, and is connected to a high-temperature side discharge pipe for discharging the cooling liquid from the high-temperature heat source;
　a second high-temperature side radiator that faces a second fan, which is different from the first fan among the plurality of cooling fans, and is connected to a high-temperature side supply pipe for supplying the cooling liquid to the high-temperature heat source; and
　a high-temperature side connection pipe for supplying the cooling liquid from the first high-temperature side radiator to the second high-temperature side radiator, and the low-temperature side radiator unit includes:
  a first low-temperature side radiator that is arranged so as to face the second high-temperature side radiator on an upstream side of the flow of the cooling air, and is connected to a low-temperature side discharge pipe for discharging the cooling liquid from the low-temperature heat source;
  a second low-temperature side radiator that is arranged so as to face the first high-temperature side radiator on the upstream side of the flow of the cooling air, and is connected to a low-temperature side supply pipe for supplying the cooling liquid to the low-temperature heat source; and
  a low-temperature side connection pipe for supplying the cooling liquid from the first low-temperature side radiator to the second low-temperature side radiator.

2. The vehicle heat exchange system according to claim 1, wherein
  an air volume of the first fan facing the first high-temperature side radiator and the second low-temperature side radiator is more than that of the second fan facing the second high-temperature side radiator and the first low-temperature side radiator.

3. The vehicle heat exchange system according to claim 1, further comprising:
  a first hydraulic motor and a second hydraulic motor which are configured to drive the first fan and the second fan, respectively;
  a hydraulic pump for supplying hydraulic oil to the first hydraulic motor and the second hydraulic motor,
  a flow rate control valve configured to change a distribution ratio of the hydraulic oil to be supplied from the hydraulic pump to the first hydraulic motor and the second hydraulic motor;
  a temperature sensor configured to detect a cooling liquid temperature that is a temperature of the cooling liquid passing through the high-temperature side discharge pipe; and
  a controller configured to control an air volume of the first fan and an air volume of the second fan,
  wherein
  the controller is configured to:
    control the flow rate control valve so as to, in a temperature range where the cooling liquid temperature detected by the temperature sensor is less than a first temperature, increase a flow rate of the hydraulic oil to the first hydraulic motor more than a flow rate of the hydraulic oil to the second hydraulic motor, and also increase a difference between both the flow rates as the cooling liquid temperature increases, and
    control the flow rate control valve so as to, in a temperature range where the cooling liquid temperature detected by the temperature sensor is equal to or higher than the first temperature, increase the flow rate of the hydraulic oil to the first hydraulic motor more than the flow rate of the hydraulic oil to the second hydraulic motor, and also reduce the difference between both the flow rates as the cooling liquid temperature increases.

4. The vehicle heat exchange system according to claim 3, wherein
  the hydraulic pump is a variable displacement hydraulic pump whose capacity is variable in accordance with control by the controller, and
  the controller is configured to increases the capacity so as to increase a total flow rate to the first hydraulic motor and the second hydraulic motor as the cooling liquid temperature increases.

5. A dump truck comprising the high-temperature heat source, the low-temperature heat source, and the vehicle heat exchange system according to claim 1,
  wherein
  the vehicle heat exchange system is disposed such that the flow of the cooling air generated by the plurality of cooling fans matches a traveling direction of the dump truck.

* * * * *